July 4, 1950 W. H. BLISS 2,513,910

MULTIPLEX TELEGRAPH SYSTEM

Filed March 28, 1945 4 Sheets-Sheet 1

INVENTOR.
WARREN H. BLISS.
BY H. S. Grover
ATTORNEY.

July 4, 1950 W. H. BLISS 2,513,910

MULTIPLEX TELEGRAPH SYSTEM

Filed March 28, 1945 4 Sheets-Sheet 2

INVENTOR.
WARREN H. BLISS.
BY H. S. Grover
ATTORNEY.

July 4, 1950 W. H. BLISS 2,513,910

MULTIPLEX TELEGRAPH SYSTEM

Filed March 28, 1945 4 Sheets-Sheet 3

INVENTOR.
WARREN H. BLISS.
BY H. S. Grover
ATTORNEY.

INVENTOR.
WARREN H. BLISS.
BY H. S. Grover
ATTORNEY.

Patented July 4, 1950

2,513,910

UNITED STATES PATENT OFFICE 2,513,910

MULTIPLEX TELEGRAPH SYSTEM

Warren H. Bliss, Riverhead, N. Y., assignor to Radio Corporation of America, a corporation of Delaware Application March 28, 1945, Serial No. 585,344

10 Claims. (Cl. 250—9)

The present invention relates to a multiplex telegraph system in which the intelligence is conveyed by a frequency shift keying procedure, and channel phasing (assignment of different channels to the common path) is accomplished automatically by means of a synchronizing component of the transmitted signal.

An important advantage of the present invention lies in the complete elimination of the usual mechanical or electronic channel selecting distributors customarily employed in multiplex systems. Channeling is performed in the system of the present invention by synchronized gating circuits, and the operation of each channel is made to be entirely independent of the others.

Another advantage of the present invention lies in the high degree of flexibility of the system which enables the number of channels, the amount of time alloted to each channel and the amount of time used for transmitting the phasing signal to be adjusted to meet various transmission speeds and conditions of the transmitting medium.

A further advantage of the invention over known systems is that a large portion of the receiving end equipment is identical with that at the sending end. From a commercial aspect this has many practical values for two-way operation.

Figure 1:
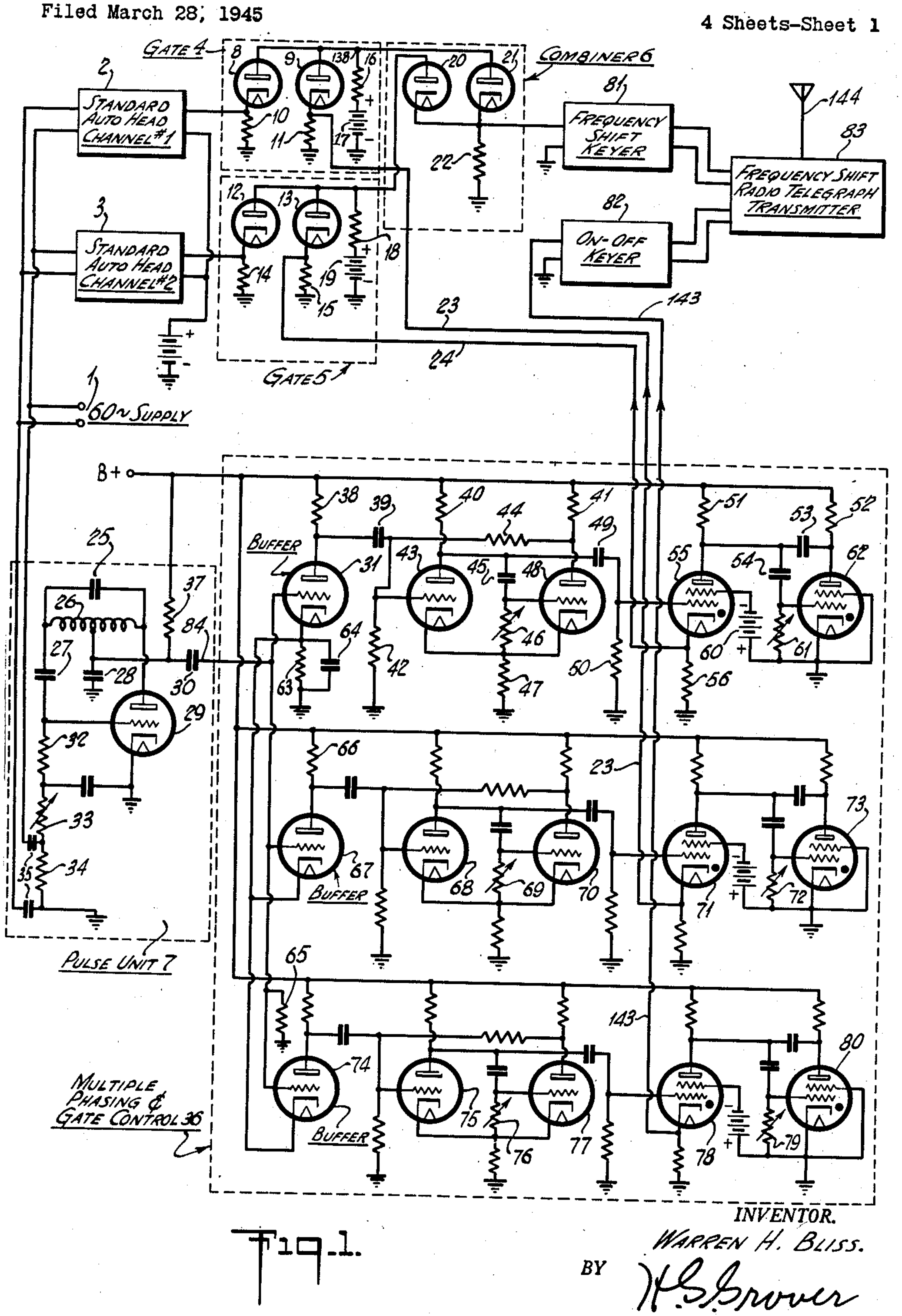
Figure 2:
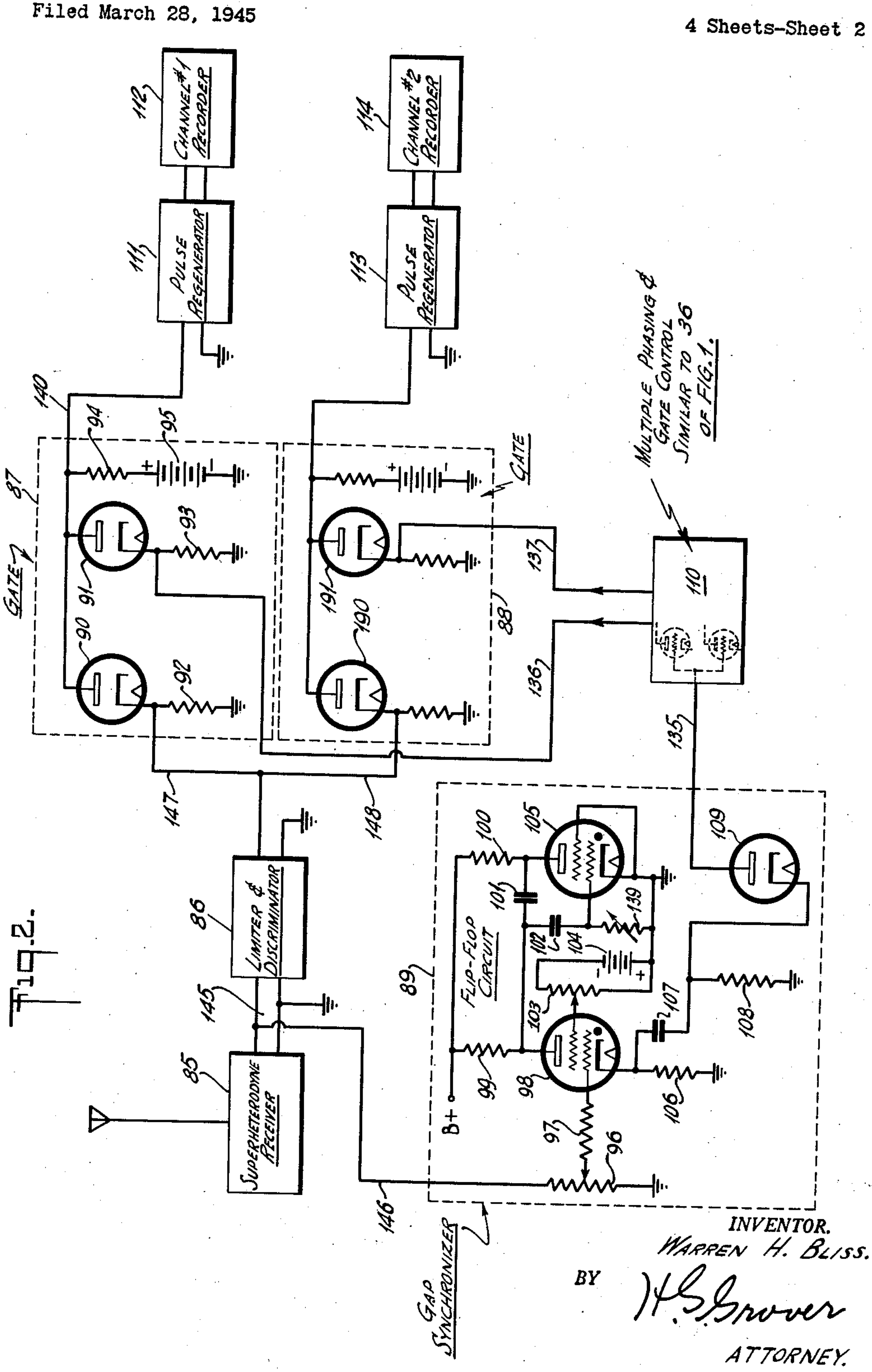
Figure 3:
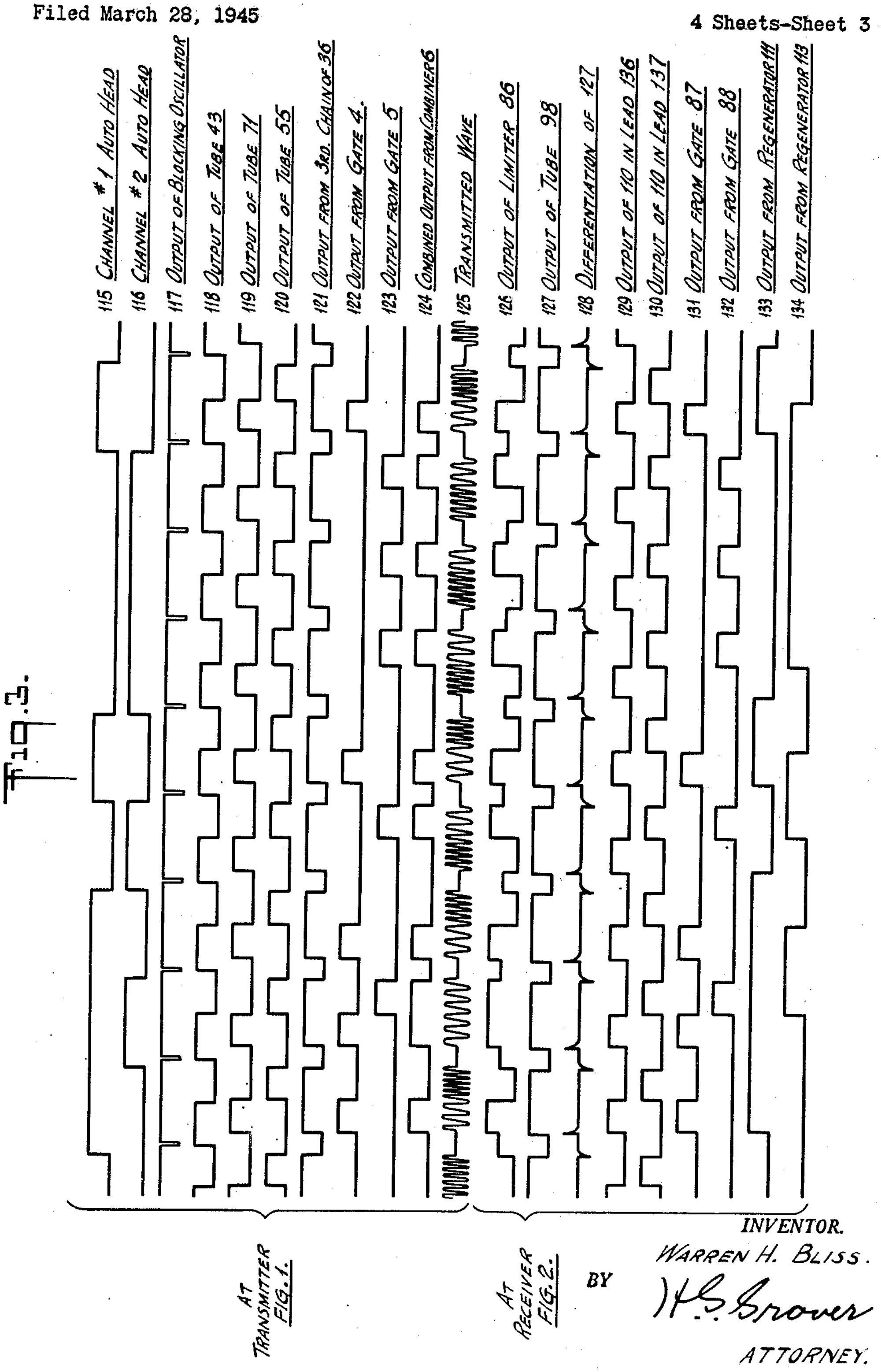
Figure 4:
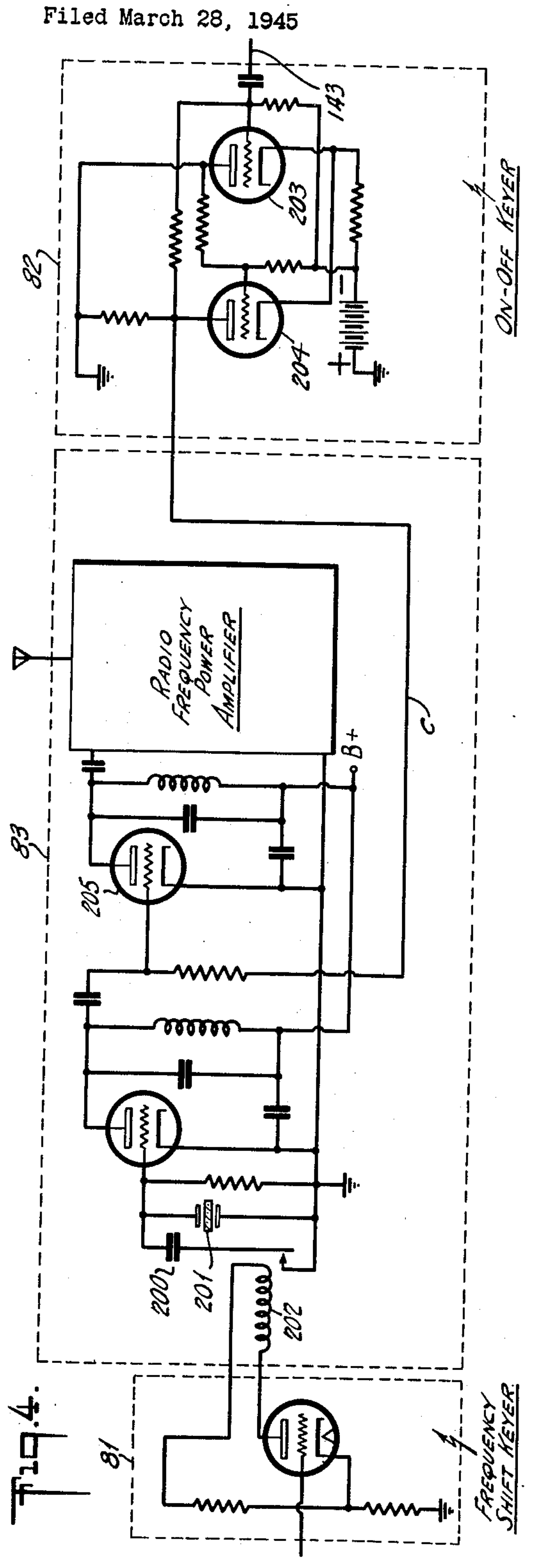
Figure 5:
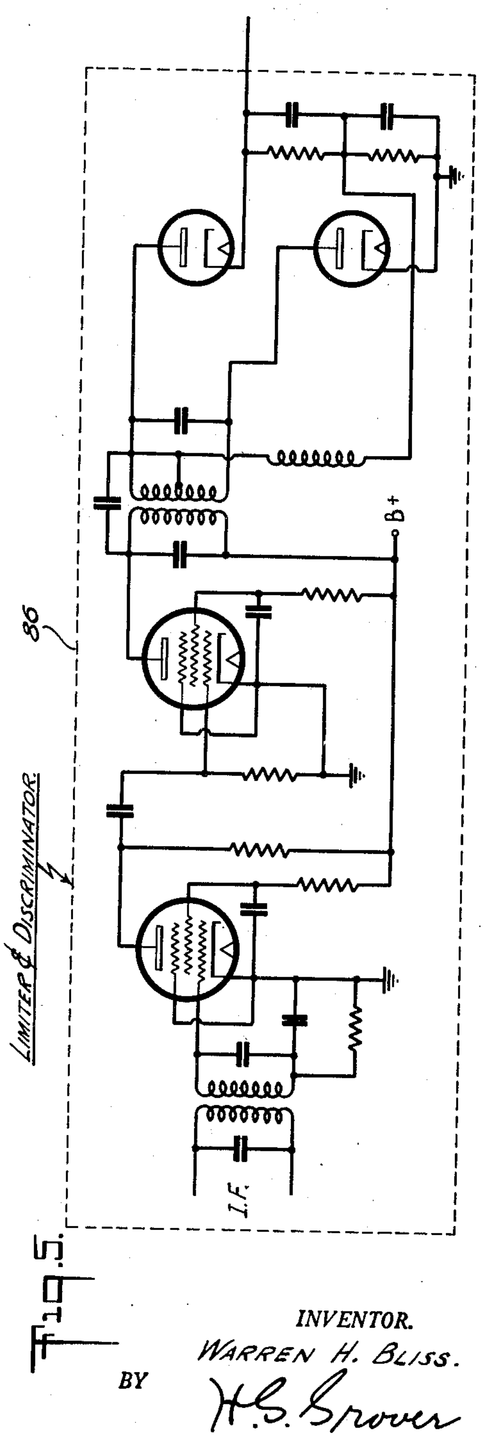

A more detailed description of the invention follows in conjunction with a drawing, in which Figs. 1 and 2 illustrate, by way of example, the sending end and receiving end apparatus, respectively, of a complete multiplex telegraph system in accordance with the invention; Fig. 3 is a series of wave forms given in explanation of the operation of the system of Figs. 1 and 2; Fig. 4 shows the circuit details of the frequency shift keyer, the on-off keyer and the frequency shift radio telegraph transmitters of Fig. 1; and Fig. 5 illustrates the circuit details of the limiter and discriminator of Fig. 2.

A specific embodiment of the sending end equipment of the invention is illustrated in Fig. 1. Although a two channel multiplex system is illustrated by way of example, any number of channels up to 10 or 12 may be used.

In Fig. 1, units 2 and 3 are Standard Auto Heads used in telegraph practice to convert perforated tape characters (constituting the intelligence impressed on an advancing tape) into dots and dashes. The outputs of these units 2 and 3, in the form of these dots and dash telegraph characters, are fed into gate circuits 4 and 5. The auto heads may be any suitable automatic telegraph transmitter, such as the standard Wheatstone type or Creed arrangement.

A 60 cycle supply 1 is used to synchronously drive units 2 and 3 and also to synchronize pulse unit 7. Unit 7 is a blocking oscillator of the Hartley type having a vacuum triode 29, a tank circuit composed of coil 26 and condenser 25, a series plate supply resistor 37, a plate supply bypass condenser 28, a grid condenser 27, and a grid leak resistor consisting of three resistors 32, 33 and 34 in series. Resistor 33 is variable for the purpose of adjusting the blocking rate. Across resistor 34 is supplied the 60 cycle synchronizing voltage through condensers 35.

The pulse output of blocking oscillator 7 is taken out through condenser 30 on lead 84 and fed into a multiple phasing and gate control unit 36. The input portion of unit 36 consists of three buffer vacuum triodes 31, 67 and 74. The control grids of these triodes are all connected to lead 84 from the blocking oscillator 7 and to ground through a common resistor 65. The cathodes of these same triodes have a common resistor 63 and common condenser 64 which is connected to ground, as shown.

Triode 31 has a plate resistor 38. Its plate is coupled to the grid of vacuum triode 43 by way of condenser 39. Triodes 43 and 48 comprise a flip-flop circuit (which can be called a self-restoring trigger circuit) with triode 48 in the normal stabilized conduction state and tube 43 in a normally non-conductive state. There are plate resistors 40 and 41, a resistor 44 connecting the grid of tube 43 with the plate of tube 48, a condenser 45 connecting the plate of tube 43 with the grid of tube 48, and a common cathode resistor 47. Triode 43 has a fixed grid resistor 42, while triode 48 has a variable grid resistor 46. The output of this flip-flop circuit is taken from the plate of triode 43 and fed via condenser 49 to the grid of a second flip-flop or self-restoring trigger circuit composed of gas tetrodes 55 and 62.

Gas tetrodes 55 and 62 have plate resistors 51 and 52 and a commutating condenser 53 interconnecting the plates of these tubes. Tube 62 is normally in a stabilized conducting state and has its control grid connected to the plate of tube 55 through condenser 54 and also to ground through variable resistor 61. Tube 55 is normally in a non-conductive state. The screen grid and cathode of tube 62 are connected to ground. Tube 55 has a grid resistor 50, a cathode resistor 56 and a screen grid negative bias battery 60. The output of this portion of the circuit is taken from the cathode of tube 55 by way of lead 24 and is fed into gate circuit 5.

A characteristic of both of these flip-flop circuits is that a triggering pulse of suitable polarity will cause the two tubes of the circuit to reverse their states of conduction, and after an interval of time, depending upon the time constants of the circuit, the conductive states of the two tubes will again revert to their normal conditions.

The rest of the multiple phasing and gate control unit 36 consists of two more chains of flip-flop circuits identical with the one just described. They have input buffer triodes 67 and 74, first flip-flop circuit tubes 68, 70 and 75, 77, respectively, and second flip-flop circuit gas tubes 71, 73 and 78, 80, respectively. The output of tube 71 is fed into gate circuit 4 by way of lead 23. The output of tube 78 is fed into the on-off keyer 82 by way of lead 143.

Unit 4 is a gate circuit consisting of vacuum diodes 8 and 9, input resistors 10 and 11, output resistor 16 and a battery 17. This gate circuit operates in channel 1 from standard auto head 2. A second gate circuit 5, identical with unit 4, operates in channel 2 from auto head 3. The diodes of gates 4 and 5 are conductive in the absence of a positive pulse from either the autoheads 2 and 3 or from leads 23 and 24.

Vacuum diodes 20 and 21 and a common output resistor 22 comprise a circuit for combining the outputs of the gate circuits. These diodes 20 and 21 are conductive only when the two diodes of each of their respective associated gates 5 and 4 are non-conductive.

Unit 83 is a conventional frequency shift radiotelegraph transmitter with a frequency shift keyer unit 81 and an on-off keyer unit 82.

Fig. 2 illustrates the receiving end equipment. Unit 85 is a conventional superheterodyne receiver whose intermediate frequency output is fed to a limiter and discriminator unit 86, and to a gap synchronizing unit 89 via lead 146. The output of unit 86 is supplied to two gate circuits 87 and 88 via leads 147 and 148, respectively.

The gap synchronizing unit 89 is essentially a flip-flop circuit consisting of gas tetrodes 98 and 105. There is an input potentiometer 96 in circuit with the first grid of gas tube 98. Other circuit elements are arranged the same as those associated with gas tubes 55 and 62 of Fig. 1, except that the screen grid of tetrode 98 is arranged for variable negative bias from battery 104 through potentiometer 103. The output, taken from the cathode of tube 98, is fed through a differentiating condenser 107 and a diode 109 to a multiple phasing and gate control unit 110 by way of lead 135.

Multiple phasing and gate control unit 110 is identical with the upper two circuit portions of unit 36 of the sending end equipment, Fig. 1. However, the lower one-third of unit 36, Fig. 1, is not used when this type of circuit is employed at the receiving terminal as illustrated by unit 110, Fig. 2. The outputs of unit 110 appear on leads 136 and 137 and are fed into gate circuits 87 and 88.

These gate circuits 87 and 88 are the same as gate circuits 4 and 5 of the sending end equipment and operate in the same manner. The outputs of the two gate circuits 87 and 88 are fed into pulse regenerators 111 and 113, respectively. These pulse regenerators are fully described in my patent application entitled "Pulse Regenerator Circuit," Ser. No. 590,822 filed April 28, 1945.

Units 112 and 114 are conventional telegraph signal recorders, such as the ink slip type.

Fig. 3 consists of a series of wave forms representing voltage variations at various points designated hereinafter and illustrates the operation of the invention. Lines 115 and 116 show the wave forms of the outputs of standard auto heads 2 and 3, respectively, when the character NE is sent on channel 1 and the character U is sent on channel 2. Wave forms 115 and 116 employ conventional length dot and dash code characters, although it should be understood that the inventon is not limited to dot and dash characters only, since the invention is also applicable to other systems which may employ printers wherein a plurality of equal length units or code characters (baud length) are employed.

Pulse unit 7 operates as a blocking oscillator and a negative voltage pulse is developed across plate resistor 37 for each group of oscillations of the blocking cycle. These pulses are shown as line 117 of Fig. 3.

In order to properly synchronize the outputs of auto heads 2, 3 and pulse 7, they are all connected to a common 60 cycle supply. The pulse frequency of unit 7 is adjusted to the desired value by means of variable resistor 33. Although only one speed of operation for a two channel system is illustrated in this disclosure, it should be understood the invention is capable of providing various speeds and different number of channels.

The gating circuits 4 and 5 serve to select certain parts of the signals from each channel and their outputs are combined to produce a composite signal which is transmitted. In order to operate the gating circuits in the proper manner, the multiple phasing and gate control unit 36 is provided. It consists of three chains or circuit portions each of which has a buffer or input tube, an adjustable delay two-tube element, and an adjustable length two-tube control element.

Referring to Fig. 1, the pulses from unit 7 (line 117 of Fig. 3) are passed through a buffer tube 31, where the polarity of the pulses is reversed, and applied to the control grid of triode 43. Tube 31 is normally conductive and becomes non-conductive for the duration of the negative pulse applied to its control grid over lead 84. Triodes 43 and 48 are connected in a flip-flop circuit with tube 48 conducting and tube 43 normally non-conducting in the stable state. The application of a positive pulse from the plate of tube 31 (which occurs when tube 31 becomes non-conductive) to the control grid of tube 43 via condenser 39, causes this tube 43 to become conductive and tube 48 to become non-conductive, in which condition the flip-flop circuit is in the active state. Such action occurs because of the regenerative interconnection between the electrodes of the two tubes.

After each triggering of vacuum tube 43, the second vacuum tube 48 of the trigger circuit 43 recovers its state of conduction as soon as condenser 45 discharges sufficiently through resistor 46 to allow the control grid voltage of tube 48 to rise above the cut-off value. The length of conduction period of tube 43 is thus controlled by the value of resistor 46. With the repeated application of pulses from triode 31, tube 43 holds conduction during the first portion of each pulse cycle while tube 48 holds conduction during the latter part of each pulse cycle. Wave form 118 of Fig. 3 shows the conduction versus time curve for tube 43. Flip-flop circuit 43, 48 constitutes a pulse delay circuit, in effect.

The output of this two-tube delay circuit is taken from the plate of tube 43, differentiated or peaked by condenser 49, and passed on to the grid of tube 55. It is the terminating or trailing edge of the output pulse from tube 43 which produces the positive pulse necessary to trigger or fire tube 55. Gas tetrodes 55 and 62 operate to produce a result similar to tubes 43 and 48 and the conduction time of tube 55 is adjusted by means of resistor 61. The output of tube 55, appearing on lead 24, is given as line 120 of Fig. 3. It should be noted that the time when tube 55 starts conduction for each pulse cycle is controlled by resistor 46; the phase of the gate control pulses from tube 55 (line 120) can be set at any desired value with respect to the main control pulses shown in line 117.

A similar set of gate control pulses (line 119) is developed by the second chain of the multiple phasing and gate control unit 36. These occur on lead 23 and their phase differs from those on lead 24 as shown by wave forms 119 and 120. This difference in phase is achieved by using different time constants for the second chain trigger circuits than for the first chain.

By means of gating circuit 4, certain parts of the telegraph signals of channel 1 from auto head 2 are passed on to the pulse combining unit 6. This is accomplished by the gating action as follows: When no positive voltage is applied to resistors 10 and 11, point 138 remains at a comparatively low value of potential since resistor 16 is several times as large as either of the equal resistors 10 and 11. In the presence of this low value of potential on point 138, diode 21 of combiner 6 is essentially non-conductive. Application of a positive voltage to the cathode of either diode 8 or 9 alone causes very little effect on the potential of point 138 but the simultaneous application of positive voltages to the two cathodes causes both diodes to cease conduction, as a result of which point 138 rises in potential to a value equal to the voltage of battery 17. This rise in potential on point 138 is sufficient to cause diode 21 to conduct for the duration of the potential application.

Because of the fact that positive pulses must be applied simultaneously to both diodes of each gate 4 or 5, in order to produce the desired effect on the combiner 6, it will be seen that the gating voltage on lead 23 allows only a portion of the signal from auto head 2 in channel #1 to be passed on to combining unit 6, as shown by wave form 122. In a like maner the channel #2 wave form 116 from auto head 3 is gated by wave form 120 on lead 24 to cause diode 20 of combiner 6 to conduct and give the output of line 123. It should be noted that each dash in the telegraph code auto head signals in channels #1 and #2 appearing in lines 115 and 116 has been converted to three short spaced pulses (note lines 122 and 123), while each dot in the auto-head signals in channels #1 and #2 has been converted to a single short pulse.

Diodes 20 and 21 combine the outputs of gating units 4 and 5 in a common resistor 22. This combined wave form is shown as line 124 and is fed into a frequency shift keyer 81.

In order to transmit a suitable phasing signal that may be used at the receiving terminal to segregate the channels, the radio frequency of the transmitter 83 at the sending point is keyed on and off according to wave form 121. Wave form 121 is produced by the third chain of the multiple phasing and gate control unit 36; namely, electron tubes 74, 75, 77, 78, and 80 which function in the same manner as tubes 31, 43, 48, 55 and 62, respectively. This wave form 121 is applied to the on-off keyer 82 by means of lead 143, and this keyer controls the radio transmitter 83 in accordance with this wave form.

Wave form 125 illustrates the general character of the transmitted wave sent out by transmitter 83 over antenna 144. It consists of gaps caused by the on-off keyer 82 and mark and space frequencies are controlled by the frequency shift keyer 81. A lower frequency is shown for mark condition than for space condition. By way of example only, the output frequencies for mark and space conditions might be 7070 kc. and 7071 kc., respectively.

An inspection of wave form 121, 124 and 125 will show the following: Whenever a pulse occurs in the combined signal of wave form 124, simultaneously with a pulse of wave form 121, the transmitter 83 sends out a mark frequency for the duration only of the pulse in wave form 124. In the intervals between pulses in wave form 124 and during the occurrence of the pulses in wave form 121, the transmitter 83 sends out a space frequency. During the gaps or intervals between pulses in wave form 121, there is no radio frequency output from transmitter 83.

At the radio receiving terminal (Fig. 2), the signal is picked up by means of a superheterodyne radio receiver 85 whose intermediate frequency is taken as the output and fed over leads 145 into an amplitude limiter and frequency discriminator unit 86 and also by way of lead 146 into gap synchronizing unit 89. Wave form 125 may also be considered as the general character of the output of receiver 85 as mentioned above. The transmitted wave form from the antenna 144 of Fig. 1 may, in general, occur at at least several megacycles while the intermediate frequency output of the receiver 85 of Fig. 2 may be of the order of several hundred kilocycles.

The limiter and discriminator unit 86 may be the conventional circuit used in frequency modulation receivers and it serves to convert the incoming wave form 125 into the form shown by line 126. Wave form 126 has three values of level corresponding to mark, space and gap as radiated from the sending point (Fig. 1). The center value of level, corresponding to the gap phasing signal may be disregarded in this wave form 126, as it is not used.

However, the gap phasing signal is used directly from wave form 125 by means of synchronizing unit 89. The two gas tetrodes 98 and 105 comprise a self-restoring trigger or flip-flop circuit and function in a manner similar to comparable circuits described in Fig. 1, for example, tubes 55 and 62. Tube 105 is normally conducting and tube 98 normally non-conducting. As the incoming signal voltage in lead 146 rises at the termination of each gap, tube 98 is fired or triggered into conduction. The conduction period of tube 98 is adjusted by means of resistor 139 to be nearly equal to the original pulse period of line 121. The output wave form of tube 98 is shown as line 127 (Fig. 3), which corresponds to wave form 121.

Potentiometer 103 supplies an adjustable bias control to the screen grid of tube 98 and this bias operates as an input signal threshold control in order to prevent false triggering of tube 98 by noise pulses occurring in the signal synchronizing gap. Putting it in other words, the rise in potential on lead 146 necessary to operate tube 98 must exceed a predetermined value determined by the bias control on the screen grid of tube 98.

A differentiating condenser 107 and resistor 108 convert wave form 127 into wave form 128. and diode 109 passes the negative pulses of this wave form on to a multiple phasing and gate control unit 110. Unit 110 performs in exactly the same manner as the corresponding unit 36 in Fig. 1 and its two outputs appearing on leads 136 and 137 are as illustrated by lines 129 and 130 of Fig. 3. Actually, unit 110 includes the same circuit elements as the upper two chain circuit portions of unit 36. The third or lower portion of unit 36 in Fig. 1 is omitted from unit 110 in Fig. 2. It should be observed that wave forms 129 and 130 are similar to wave forms 119 and 120.

Gating units 87 and 88 also function exactly the same as similar units 4 and 5 at the sending and except that they separate the signals for each channel from the composite input signal. For example, the wave form of line 126 is applied via lead 147 to the cathode of diode 90 while the wave form of line 129 is applied via lead 136 to the cathode of diode 91. The gated output of this unit 87 as it appears on lead 140 is shown by line 131. This is composed of signals corresponding to those of channel #1.

The wave form of line 126 is also applied via lead 148 to the cathode of diode 190 while the wave form of line 130 is applied via lead 137 to the cathode of diode 191. Thus similar type signals for channel #2 (line 132) constitute the gated output from gate unit 88.

It should be noted that the gate 87 passes pulses (note wave form 131) only when pulses occur simultaneously in lead 136 and lead 147 as represented by wave forms 129 and 126. The pulses in wave form 126 must, however, be above the center value to be passed by gate 87. Similarly, gate 88 passes (note wave form 132) only when pulses occur simultaneously in lead 137 and lead 148 as represented by wave forms 130 and 126. The pulses in wave form 126 must, however, be above the center value.

Pulse regenerators 111 and 113 are used to elongate (reconstruct or rebuild) the pulse type signals of lines 131 and 132 into full bodied dots and dashes as shown by lines 133 and 134, respectively. These pulse regenerators are preferably of the type disclosed in my copending application Serial No. 590,822, filed April 28, 1945.

The received signals for the two channels may be registered on any type of a telegraph recorder such as the ink slip type indicated as units 112 and 114.

The illustrative wave forms of Fig. 3 show that the fundamental pulse period (pulses of line 117) is divided into three parts as portrayed by the transmitted wave form 125. This is for a two channel multiplex system. The relative lengths of these three parts (gap portion, channel #1 portion and channel #2 portion) may be proportioned in any desired manner as propagation conditions and practice may warrant. This is accomplished by appropriate adjustment of variable registors 46, 61, 69, 72, 76 and 79 of multiple phasing and control unit 36 of the sending end equipment, Fig. 1, and by similar elements in the multiple phasing unit 110 at the receiving end.

For a three channel multiplex, a fourth chain of electron tubes, (such as tubes 31, 43, 48, 55 and 62, Fig. 1), would be included in the multiple phasing and gate control unit 36 and a third gate circuit like unit 4 or 5 would be needed. Also similar additional items would be used at the receiving terminal. The fundamental pulse period would then be divided suitably into four parts instead of three, as previously explained. Obviously, the invention may be made to operate with any desired number of channels.

In Fig. 4 there are shown the circuit details of the boxes 81, 82 and 83 of Fig. 1, corresponding to the frequency shift keyer, the on-off keyer and the frequency shift radio telegraph transmitter. In the frequency shift transmitter, the shift in frequency is accomplished by switching a small condenser 200 in parallel with the quartz crystal 201. A relay 202 is shown as a means whereby mark and space signals may be used to produce frequency shifts comparable thereto. The frequency shift keyer 81 illustrates a simple means for using the output of combiner 6 (Fig. 1) to operate the relay 202. The on-off keyer 82 utilizes the potential variation on lead 143 to key the transmitter. Two vacuum triodes 203 and 204 operate in an Eccles-Jordon trigger circuit with a plate potential supply source having its positive terminal at ground potential. The output is taken from the anode of tube 204 and is applied via lead C as control grid bias for amplifier triode 205 in the transmitter. For the gap or off intervals the bias applied to tube 205 is sufficiently negative to block the transmission of radio frequency signals from the oscillator section to the power amplifier.

Fig. 5 shows conventional details of a limiter and discriminator which might be used for box 86 in Fig. 2. These details are well known in the frequency modulation art and are not being claimed per se.

What is claimed is:

1. A radio telegraph multi-channel system in which the conventional length code characters in each channel are converted into one or more spaced pulses of constant amplitude but appreciably shorter in duration than said code characters, comprising a plurality of sources of conventional length telegraph code signals corresponding in number to the number of channels in the system, a phasing circuit for sequentially assigning portions of the signals from said sources to a common radio frequency transmitter, means for assuring synchronism in the operation of said sources of signals and said phasing circuit, said phasing circuit including $n+1$ chain circuits wherein $n$ corresponds in number to the number of said signal sources, means supplying recurring waves to said chain circuits, said chain circuits each including a pair of self-restoring trigger circuits operating in cascade, the trigger circuits in the different chains having different time constants and having such values that the outputs from the different chains constitute phase displaced pulses whose durations are shorter than the code characters from said signal sources, a gate circuit individual to each channel and located between the output of the signal source for each channel and said common radio frequency transmitter, connections from the different outputs of said chain circuits to different gate circuits, there being one connection from the output of each chain circuit to a single gate circuit, each of said gate circuits being so constructed and arranged that it operates to pass a pulse only during the simultaneous occurrence of a telegraph code character from its associated signal source and a pulse from the chain connected to it, as a result of which the duration of the pulse passed by the gate circuit is limited by the duration of the pulse obtained from its associated chain circuit, means for combining the outputs of said gate circuits to form a composite signal composed of pulses obtained from the different gate circuits, means for passing a signal representative of said composite signal to said radio frequency transmitter, and means for keying said transmitter on and off at a rate which is the same as the pulse rate in one of said chains.

2. A radio telegraph multi-channel system in which the conventional length code characters in each channel are converted into one or more spaced pulses of constant amplitude but appreciably shorter than said code characters, comprising a plurality of sources of conventional length telegraph code signals corresponding in number to the number of channels in the system, a phasing circuit for sequentially assigning portions of the signals from said sources to a common radio frequency shift transmitter, a source of low audio frequency current for assuring synchronism in the operation of said sources of signals and said phasing circuit, said phasing circuit including a plurality of chain circuits corresponding in number to the number of said signal sources, means supplying recurring waves to said chain circuits, said chain circuits each including a pair of self-restoring trigger circuits operating in cascade, the trigger circuits in the different chains having different time constants and having such values that the outputs from the different chains constitute phase displaced pulses whose durations are shorter than the code characters from said signal sources, a gate circuit individual to each channel and located between the output of the signal source for each channel and said common radio frequency transmitter, connections from the different outputs of said chain circuits to different gate circuits, there being one connection from the output of each chain circuit to a single gate circuit, each of said gate circuits being so constructed and arranged that it operates to pass a pulse only during the simultaneous occurrence of a telegraph code character from its associated signal source and a pulse from the chain connected to it, as a result of which the duration of the pulse passed by the gate circuit is limited by the duration of the pulse obtained from its associated chain circuits, means for combining the outputs of said gate circuits to form a composite signal composed of pulses obtained from the different gate circuits, a frequency shift keyer controlling said radio frequency transmitter in response to said composite signal, an on-off keyer also controlling said radio frequency transmitter, said phasing circuit including still another chain circuit similar in construction and operation to said first chain circuits and whose output is connected to said on-off keyer.

3. A radio telegraph multi-channel system in which the conventional length code characters in each channel are converted into one or more spaced pulses of constant amplitude but appreciably shorter in duration than said code characters, comprising a plurality of sources of conventional length telegraph code signals corresponding in number to the number of channels in the system, a phasing circuit for sequentially assigning portions of the signals from said sources to a common radio frequency transmitter, means for assuring synchronism in the operation of said sources of signals and said phasing circuit, said phasing circuit including $n+1$ chain circuits wherein $n$ corresponds in number to the number of said signal sources, means supplying recurring waves to said chain circuits, said chain circuits each including a self-restoring trigger circuit, the trigger circuits in the different chains having different time constants and having such values that the outputs from the different chains constitute phase displaced pulses whose durations are shorter than the code characters from said signal sources, a gate circuit individual to each channel and located between the output of the signal source for each channel and said common radio frequency transmitter, connections from the different outputs of said chain circuits to different gate circuits, there being one connection from the output of each chain circuit to a single gate circuit, each of said gate circuits being so constructed and arranged that it operates to pass a pulse only during the simultaneous occurrence of a telegraph code character from its associated signal source and a pulse from the chain connected to it, as a result of which the duration of the pulse passed by the gate circuit is limited by the duration of the pulse obtained from its associated chain circuit, means for combining the outputs of said gate circuits to form a composite signal composed of pulses obtained from the different gate circuits, means for passing a signal representative of said composite signal to said radio frequency transmitter, and means for keying said transmitter on and off at a rate which is the same as the pulse rate in one of said chains.

4. A system in accordance with claim 1, characterized in this that the chain circuit comprises a vacuum tube trigger circuit controlling the firing of a gaseous tube trigger circuit, each of said trigger circuits including two interconnected multi-electrode structures.

5. A radio telegraph multi-channel system in which the conventional length code characters in each channel are converted into one or more spaced pulses of constant amplitude but appreciably shorter in duration than said code characters, comprising a plurality of sources of conventional length telegraph code signals corresponding in number to the number of channels in the system, a phasing circuit for sequentially assigning portions of the signals from said sources to a common radio frequency transmitter, means for assuring synchronism in the operation of said sources of signals and said phasing circuit, said phasing circuit including $n+1$ chain circuits wherein $n$ corresponds in number to the number of said signal sources, means coupled to said chain circuits for supplying recurring waves thereto, said chain circuits each including a pair of self-restoring trigger circuits operating in cascade, the trigger circuits in the different chains having different time constants and having such values that the outputs from the different chains constitute phase displaced pulses whose durations are shorter than the code characters from said signal sources, a gate circuit individual to each channel and located between the output of the signal source for each channel and said common radio frequency transmitter, connections from the different outputs of said chain circuits to different gate circuits, there being one connection from the output of each chain circuit to a single gate circuit, each of said gate circuits being so constructed and arranged that it operates to pass a pulse only during the simultaneous occurrence of a telegraph code character from its associated signal source and a pulse from the chain connected to it, as a result of which the duration of the pulse passed by the gate circuit is limited by the duration of the pulse obtained from its associated chain circuit, means for combining the outputs of said gate circuits to form a composite signal composed of pulses obtained from the different gate circuits, means for passing a signal representative of said composite signal to said radio frequency transmitter, and means for keying said transmitter on and off at a rate which is the same as the pulse rate in one of said chains, and remotely located radio telegraph receiving and signal regenerating apparatus comprising a superheterodyne receiver, a plurality of gate circuits coupled in common to the output of said superhetrodyne receiver and similar in construction and operation to the gate circuits at the transmitter end of the system, a phasing circuit under control of the output of said superheterodyne receiver and including chain circuits similar in construction and operation to the chain circuits of the phasing circuit at the transmitter end, the number of chains in the phasing circuit at the receiver end of the system and the number of gate circuits at the receiver end of the system being the same as the number of channels in said system, there being a gate circuit for each channel, and a signal regenerator in the output of each gate circuit for rebuilding the signals passed by each gate to the longer conventional duration signal code characters.

6. In a radio telegraph multi-channel system, a plurality of channels each having a source of signals of conventional length code characters, a gate or shutter arrangement in circuit with each channel and having associated therewith means for passing only a portion of each code character signal, said gates providing phase displaced output pulses of shorter duration than the duration of the code characters, and means for combining the outputs of the gates into a composite signal, said last means comprising a plurality of rectifiers corresponding in number to said channels, each of said rectifiers including an anode, individual connections from said anodes to said gates, a common cathode resistor for said rectifiers and a radio frequency output circuit coupled to said cathode resistor.

7. In a radio telegraph multiplex system, a plurality of channels each having a source of signals of conventional length code characters, an electron discharge device circuit associated with each channel for passing only a portion of each code character signal in the channel, said electron discharge device circuits providing phase displaced output pulses of shorter duration than the code characters, means for combining the outputs of said electron discharge device circuits into a composite signal, said last means including a plurality of rectifiers corresponding in number to said channels, each of said rectifiers including an anode, individual connections from said anodes to said electron discharge device circuits, a common cathode impedance element for said rectifiers, a keying circuit coupled across said common cathode impedance element and controlled by said composite signal, and a radio transmitter coupled to and controlled by said keyer.

8. A system as defined in claim 7, characterized in this that said keyer is a frequency shift keyer, and said transmitter sends out different mark and space frequencies in accordance with the operation of said keyer.

9. In a radio telegraph multiplex system, wherein spaced pulses in the form of radio frequency energy of different frequencies are respectively transmitted for marking and spacing conditions, receiving and signal regenerating apparatus comprising a superheterodyne receiver, a limiter and discriminator following said receiver for converting the received signals to a wave form having different potential values at different time intervals corresponding to said marking and spacing conditions, a synchronizing generator coupled to the output of said superheterodyne receiver and responsive to the received pulses for producing other pulses having the same repetition rate as the received pulses but of a duration substantially equal to the spaces between the received pulses, a multiple phasing circuit coupled to the output of said synchronizing generator for supplying a multiplicity of phase displaced pulse trains corresponding in number to the number of channels in said system, a plurality of electron discharge device gate or shutter arrangements corresponding in number to the number of channels in said system coupled to the output of said limiter and discriminator, connections from said phasing circuit to different gates for supplying said gates with different phase displaced pulse trains, each of said gates operating to pass a pulse only during the simultaneous application thereto of both a signal from said limiter and discriminator and a pulse from said phasing circuit, and a pulse regenerator coupled to the output of each gate for rebuilding the pulses impressed thereon to longer duration code characters.

10. A system as defined in claim 9, wherein each gate comprises a pair of diodes each of which has an anode and a cathode, a direct connection between said anodes, a common output resistor for said anodes, a source of anode polarizing potential in series with said output resistor, individual cathode resistors for said diodes, a connection from the cathode of one diode to said limiter and discriminator, and a connection from the cathode of the other diode to said phasing circuit.

WARREN H. BLISS.

REFERENCES CITED

The following references are of record in the file of this patent:

UNITED STATES PATENTS

| Number | Name | Date |
|---|---|---|
| 1,189,070 | Dietz | June 27, 1916 |
| 1,194,820 | Colpitts | Aug. 15, 1916 |
| 1,744,711 | Von Arco | Jan. 21, 1930 |
| 1,979,484 | Mathes | Nov. 6, 1934 |
| 1,988,097 | Von Arco | Jan. 15, 1935 |
| 2,025,190 | Beverage | Dec. 24, 1935 |
| 2,048,081 | Riggs | July 21, 1936 |
| 2,070,418 | Beverage | Feb. 9, 1937 |
| 2,158,285 | Koch | May 16, 1939 |
| 2,172,354 | Blumlein | Sept. 12, 1939 |
| 2,262,838 | Deloraine et al. | Nov. 18, 1941 |
| 2,324,314 | Michel | July 13, 1943 |
| 2,352,634 | Hull | July 4, 1944 |
| 2,369,662 | Deloraine et al. | Feb. 20, 1945 |
| 2,376,395 | Skellett | May 22, 1945 |
| 2,428,366 | Gillman | Oct. 7, 1947 |
| 2,429,608 | Chatterjea et al | Oct. 28, 1947 |